United States Patent
Ochi et al.

(10) Patent No.: US 10,776,181 B2
(45) Date of Patent: Sep. 15, 2020

(54) INFORMATION PROCESSING DEVICE, METHOD, AND MEDIUM FOR CONTROLLING A DISPLAY BASED ON A SERVICE REGISTERED IN AN INTEGRATED CIRCUIT

(75) Inventors: Haruna Ochi, Kanagawa (JP); Naofumi Hanaki, Kanagawa (JP); Shinichi Kato, Tokyo (JP); Keitarou Watanabe, Tokyo (JP)

(73) Assignee: FELICA NETWORKS, INC., Tokyo (JP)

( * ) Notice: Subject to any disclaimer, the term of this patent is extended or adjusted under 35 U.S.C. 154(b) by 176 days.

(21) Appl. No.: 14/006,462

(22) PCT Filed: Mar. 23, 2012

(86) PCT No.: PCT/JP2012/002050
§ 371 (c)(1),
(2), (4) Date: Sep. 20, 2013

(87) PCT Pub. No.: WO2012/132375
PCT Pub. Date: Oct. 4, 2012

(65) Prior Publication Data
US 2014/0013275 A1    Jan. 9, 2014

(30) Foreign Application Priority Data
Mar. 31, 2011   (JP) .................................. 2011-077468

(51) Int. Cl.
*G06F 9/54*       (2006.01)
*G06F 3/0484*     (2013.01)
(Continued)

(52) U.S. Cl.
CPC .......... *G06F 9/542* (2013.01); *G06F 3/04842* (2013.01); *G06F 16/958* (2019.01); *G06Q 20/3263* (2020.05); *H04M 1/72525* (2013.01)

(58) Field of Classification Search
CPC .. G06Q 20/3674; G06Q 20/32; G06Q 20/341; G06Q 20/382; G06Q 20/367; G06Q 20/3823; G06F 3/04842; G07F 7/1008
(Continued)

(56) References Cited

U.S. PATENT DOCUMENTS

| 6,425,522 | B1 * | 7/2002 | Matsumoto | ........ G06Q 20/3552 235/380 |
| 2005/0015275 | A1 * | 1/2005 | Takekawa | ............. G06F 21/123 717/172 |

(Continued)

FOREIGN PATENT DOCUMENTS

| JP | 2002-169621 A | 6/2002 |
| JP | 2004-110759 A | 4/2004 |

(Continued)

OTHER PUBLICATIONS

Office action received for Japanese application No. JP 2011077468, dated Dec. 9, 2014.
(Continued)

*Primary Examiner* — Christopher J Fibbi
(74) *Attorney, Agent, or Firm* — Chip Law Group

(57) ABSTRACT

According to an illustrative embodiment an information processing device is provided. The device includes a processor for controlling acquisition of first information which indicates a service not registered in an integrated circuit of the device and a service registered in the integrated circuit of the device, the first information being acquired from within the device, controlling acquisition of second information which indicates a service registered in the integrated circuit of the device, and controlling display based on the first information and second information.

16 Claims, 16 Drawing Sheets

(51) Int. Cl.
*G06F 16/958* (2019.01)
*G06Q 20/32* (2012.01)
*H04M 1/725* (2006.01)

(58) Field of Classification Search
USPC .............. 715/810, 741, 743, 831; 705/67, 76
See application file for complete search history.

(56) References Cited

U.S. PATENT DOCUMENTS

| | | | |
|---|---|---|---|
| 2006/0009204 A1* | 1/2006 | Ophir ................ | H04M 3/42153 455/420 |
| 2006/0143135 A1* | 6/2006 | Tucker ................ | G06F 21/121 705/59 |
| 2007/0244973 A1* | 10/2007 | Pearson .............. | G06Q 10/107 709/206 |
| 2008/0222036 A1* | 9/2008 | Asai et al. ....................... | 705/41 |
| 2008/0282044 A1 | 11/2008 | Kimura et al. | |
| 2009/0098854 A1* | 4/2009 | Park et al. .................... | 455/407 |
| 2010/0076833 A1 | 3/2010 | Nelsen | |
| 2010/0082445 A1* | 4/2010 | Hodge et al. ................... | 705/21 |
| 2011/0041064 A1 | 2/2011 | Watanabe et al. | |
| 2011/0078270 A1* | 3/2011 | Galli ...................... | G06F 9/547 709/206 |
| 2011/0307354 A1* | 12/2011 | Erman ..................... | G06F 8/60 705/27.1 |

FOREIGN PATENT DOCUMENTS

| | | |
|---|---|---|
| JP | 2007-206893 A | 8/2007 |
| JP | 2007-280112 A | 10/2007 |
| JP | 2008-282157 A | 11/2008 |
| JP | 2010-218028 A | 9/2010 |
| JP | 2011-041019 A | 2/2011 |
| JP | 2011-066757 A | 3/2011 |

OTHER PUBLICATIONS

How to Use the Android Market, Android Central, https://www.youtube.com/watch?v=DBeZzglrj6E, dated Jun. 6, 2010.
Extended European Search Report for EP Application No. 12764470.6 dated Oct. 22, 2014.
Nexus One User's Guide, Google Inc. dated, Mar. 15, 2010.
Apps on SD Card—The Details, Android Developers Blog, dated Jul. 3, 2010.
iPOD touch User Guide, Apple, 2009.

* cited by examiner

FIG. 6

| SERVICE ID | SERVICE NAME | ICON | SERVICE PROVIDER NAME | LINKED CHANNEL | URL | AREA INFORMATION | | APPLICATION INFORMATION | | | | |
|---|---|---|---|---|---|---|---|---|---|---|---|---|
| | | | | | | SYSTEM CODE | AREA CODE | PACKAGE NAME | SIGNEE CERTIFICATE HASH | ACQUISITION CHANNEL | ACQUISITION URL |
| 00000001 | SERVICE A | A | PROVIDER A | APPLICATION | — | FE00 | 0080 | com.aaa.service1 | xxxxx | APPLICATION MARKET | market://aaa.service1 |
| 00000002 | SERVICE B | B | PROVIDER B | APPLICATION | — | — | — | com.bbb.service2 | xxxxx | STANDARD BROWSER | http://bbb/getapp_mfm2.html |
| 0000000X | SERVICE X | X | PROVIDER X | BROWSER | http://xxx/index.html | FE00 | 0040 | — | — | — | — |

FIG. 7

| SERVICE ID | SERVICE NAME | ICON | SERVICE PROVIDER NAME | LINKED CHANNEL | URL | APPLICATION INFORMATION | |
|---|---|---|---|---|---|---|---|
| | | | | | | ACQUISITION CHANNEL | ACQUISITION URL |
| 00000001 | [BOOKMARK] SERVICE A | bookmark A | PROVIDER A | BOOKMARK [APPLICATION] | — | APPLICATION MARKET | market://aaa.service1 |
| 00000002 | [BOOKMARK] SERVICE B | bookmark B | PROVIDER B | BOOKMARK [APPLICATION] | — | STANDARD BROWSER | http://bbb/getapp_mfm2.html |
| 0000000X | [BOOKMARK] SERVICE X | bookmark X | PROVIDER X | BOOKMARK [BROWSER] | http://xxx/index.html | — | — |

INFORMATION PROCESSING DEVICE, METHOD, AND MEDIUM FOR CONTROLLING A DISPLAY BASED ON A SERVICE REGISTERED IN AN INTEGRATED CIRCUIT

CROSS-REFERENCE TO RELATED APPLICATIONS

The present application is a national phase entry under 35 U.S.C. § 371 of International Application No. PCT/JP2012/002050 filed Mar. 23, 2012, published on Oct. 4, 2012 as WO 2012/132375 A1. Such International Application claims priority from Japanese Patent Application No. JP 2011-077468 filed in the Japanese Patent Office on Mar. 31, 2011, the entire contents of which are hereby incorporated by reference herein.

TECHNICAL FIELD

The present technology relates to information processing device and method, and a program thereof, and particularly to information processing device and method and a program thereof which enables display of a service catalog for various services.

BACKGROUND ART

In recent years, information processing devices such as mobile telephones including IC (Integrated Circuit) chips having tamper resistance have been distributed. Such an information processing device including an IC chip (hereinafter, referred to as an IC chip-mounted information processing device) can perform data communication only by, for example, being inserted into a reader-and-writer by a user. Thus, in application of the information processing device to an e-money system, a user can complete an on-the-spot payment in a shop, or the like, only by inserting the information processing device such as a mobile telephone, or the like, into a reader-and-writer.

In addition, when the above-described e-money system is used, the user can ascertain a use history, the remaining amount, and the like, thereof on the display screen by activating an application installed in the information processing device.

As such, there are various developed techniques pertaining to the IC chip-mounted information processing device, and for example, there is a proposed technique for restoring area consistency in an IC chip having two interrelated areas after data migration between IC chips (refer to PTL 1, for example).

However, since services can be freely registered and deleted in an IC chip of an IC chip-mounted information processing device, it is necessary for the device to perform the display of services registered in a memory area of the IC chip and to enable a user to view what service is being currently used in the information processing device.

For example, in order to be in a state in which services are registered in a memory area of an IC chip and used, an IC chip-mounted information processing device such as a mobile telephone, or the like, on which a platform unique to a communication carrier is installed is configured to be necessarily installed with an application required for using the services, and thus, a catalog of service information is displayed based on the information of the application. In addition, as a starting point for the user to introduce a service not registered in the IC chip, information of a link for downloading the application is displayed on a service catalog as a so-called bookmark.

On the other hand, in IC chip-mounted information processing devices of recent years on which an open platform is installed, a catalog of service information is displayed by specifying what an installed application is or what service can be currently used from each of the memory areas of the IC chip depending on the type of the service, without necessarily installing an application for using services registered in the memory areas of the IC chip.

CITATION LIST

Patent Literature

PTL 1: JAPANESE UNEXAMINED PATENT APPLICATION PUBLICATION NO. 2008-282157

SUMMARY OF INVENTION

Technical Problem

However, since it is not necessary for the IC chip-mounted information processing device on which an open platform is installed to install an application required for using a service, information such as a bookmark could not be displayed on a service catalog as in the IC chip-mounted information processing device on which a platform unique to a communication carrier is installed.

Thus, when a desired service is to be registered in an information processing device, a user needed to access a web site or an application market on which various services are provided and to search the service that the user wants to use.

The present technology takes the above circumstance into consideration, and enables display of a service catalog of various services.

Solution to Problem

According to an illustrative embodiment of the present technology, an information processing device is provided. The device includes a processor for controlling acquisition of first information which indicates a service not registered in an integrated circuit of the device and a service registered in the integrated circuit of the device, the first information being acquired from within the device, controlling acquisition of second information which indicates a service registered in the integrated circuit of the device, and controlling display based on the first information and second information.

According to an aspect of the present technology, various services can be displayed on a service catalog.

BRIEF DESCRIPTION OF DRAWINGS

FIG. 6 is a diagram illustrating a configuration of service information.

FIG. 7 is a diagram illustrating a configuration of bookmark information.

DESCRIPTION OF EMBODIMENTS

Hereinafter, embodiments of the present technology will be described with reference to drawings. Furthermore, description will be provided in the following order.
1. Display of Service Catalog of Related Art
2. Configuration of Information Processing System
3. Hardware Configuration of Mobile Terminal Device
4. Functional Configuration of Mobile Terminal Device
5. Service Catalog Display Process
6. Screen Changeover from Service Catalog
7. Service Catalog Screen Changeover Process
8. Example of Application Activated by Bookmark Information
9. Others
1. Display of Service Catalog of Related Art Before describing an embodiment of a mobile terminal device as an information processing device to which the present technology is applied, display of a service catalog in a mobile terminal device as an information processing device of the related art will be described.

Figure 1:
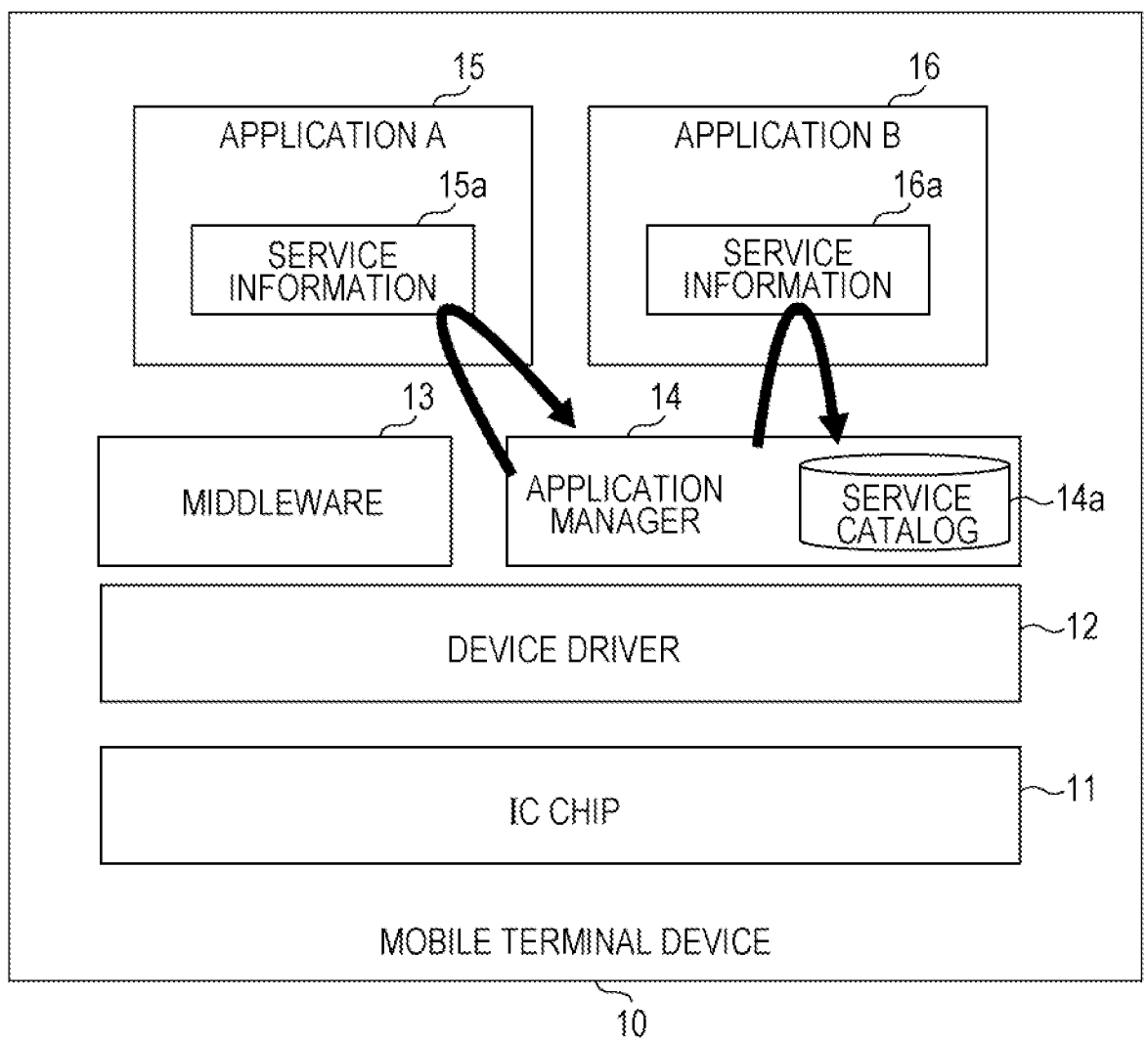
FIG. 1 is a diagram illustrating display of a service catalog by an information processing device of the related art.

FIG. 1 is a diagram illustrating display of a service catalog by a mobile terminal device of the related art as an IC chip-mounted information processing device on which a platform unique to a communication carrier is installed.

In FIG. 1, a mobile terminal device 10 includes an IC chip 11, a device driver 12, middleware 13, an application manager 14, an application A 15, and an application B 16.

The IC chip 11 includes a memory area, and a service, for example, an e-money service, or the like is registered in a predetermined area in the memory area. The device driver 12 controls each device in the mobile terminal device 10. The middleware 13 includes an API (Application Program Interface), and provides a predetermined function to the application A 15 and the application B 16.

The application manager 14 performs management of the application A 15 and the application B 16 installed in the mobile terminal device 10. The application A 15 and the application B 16 are applications provided by service providers, each of the applications has an area to be used in the memory area of the IC chip 11, and uses a service registered in the area.

In the mobile terminal device 10, the display of the service catalog is realized by the application manager 14. When the service catalog is displayed in the mobile terminal device 10, the application manager 14 acquires service information 15a and service information 16a from each of the application A 15 and the application B 16, and generates and displays a service catalog 14a based on the service information 15a and the service information 16a. In addition, for an application not installed therein, information of a link for downloading the application is described on the service catalog 14a and displayed as a bookmark.

Furthermore, in the mobile terminal device 10, the application A 15 and the application B 16 having the area to be used in the memory area of the IC chip 11 are designed not to be deleted as long as the memory area that the applications have in the IC chip 11 exists.

As such, in the mobile terminal device 10, the service catalog is displayed based on service information of the service to be used in the installed application and information of the link for unregistered service as a bookmark.

Figure 2:
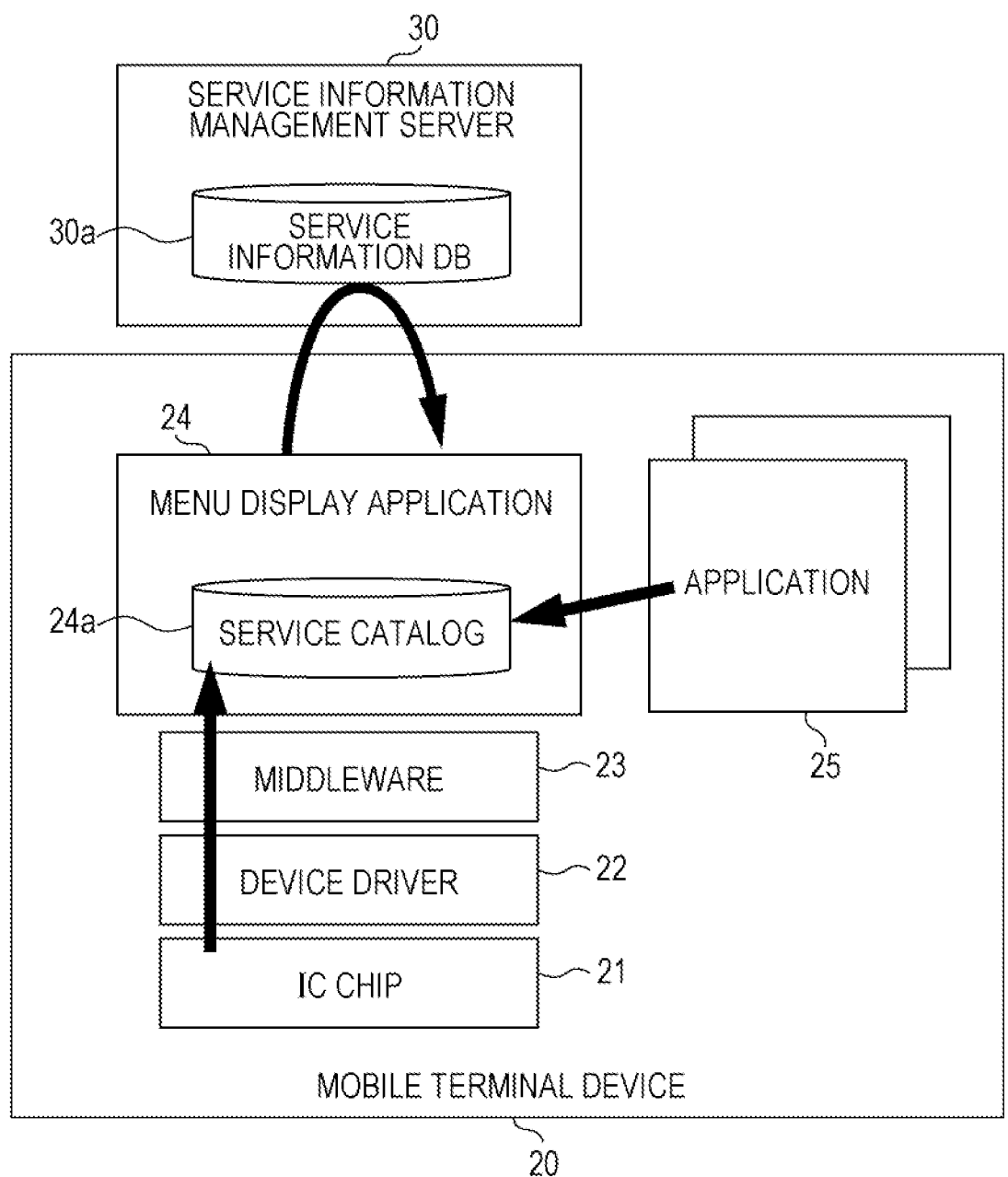
FIG. 2 is a diagram illustrating display of a service catalog by an information processing device of the related art.

FIG. 2 is a diagram illustrating display of a service catalog by a mobile terminal device as an IC chip-mounted information processing device on which an open platform of the related art is installed.

In FIG. 2, a mobile terminal device 20 includes an IC chip 21, a device driver 22, middleware 23, a menu display application 24, and an application 25.

The IC chip 21 includes a memory area, and a service, for example, an e-money service, or the like is registered in a predetermined area of the memory area. The device driver 22 controls each device in the mobile terminal device 20. The middleware 23 includes an API, and provides a predetermined function to the application 25.

Based on application information of the application 25 installed in the mobile terminal device 20 and IC chip information of the memory area of the IC chip 21 in which services are registered, the menu display application 24 acquires service information of services specified by each of the information from a service information DB 30a of a service information management server 30. In addition, the menu display application 24 generates and displays a service catalog 24a based on the service information acquired from the service information DB 30a.

However, as described above, in the mobile terminal device 20 that is the IC chip-mounted information processing device on which the open platform is installed, it was not possible to display the bookmark of a service not registered on the service catalog different from the mobile terminal device 10.

Therefore, hereinbelow, a configuration will be described in which bookmarks of registered services and unregistered services are displayed on a service catalog in the IC chip-mounted information processing device on which the open platform is installed.
2. Configuration of Information Processing System FIG. 3 is a diagram showing a configuration example of an information processing system including a mobile terminal device as an information processing device to which the technology is applied.

Figure 3:
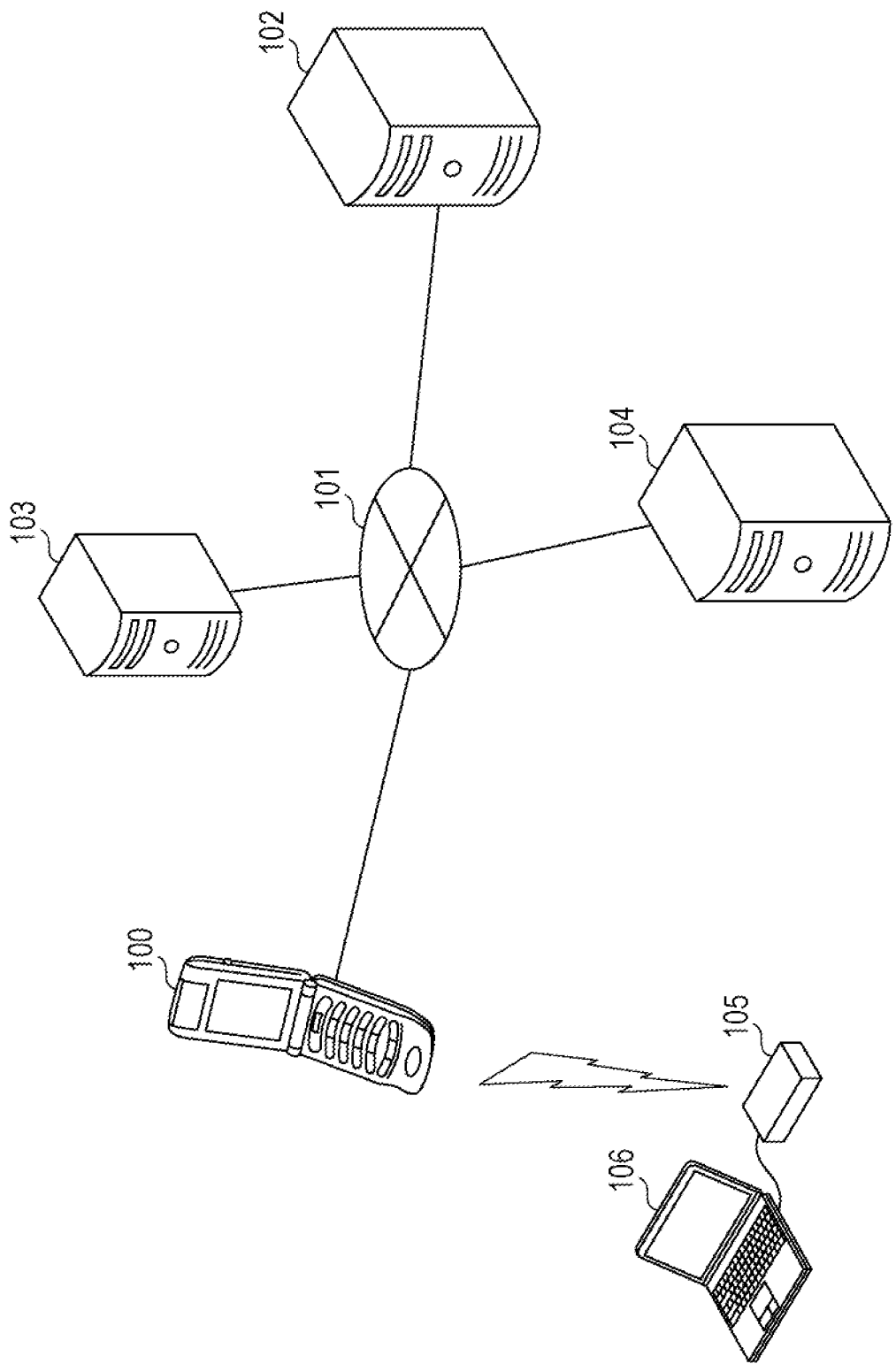
FIG. 3 is a diagram showing a configuration example of an information processing system including a mobile terminal device as an information processing device to which the present technology is applied.

The information processing system shown in FIG. 3 is mainly composed of a mobile terminal device 100 and a service information management server 102. The mobile terminal device 100 is an example of the information processing device to which the technology is applied. The mobile terminal device 100 and the service information management server 102 are configured to perform communication through a communication network 101.

The mobile terminal device 100 includes an IC chip 151 to be described later. The IC chip 151 includes a memory area that is a storage area, and a service, for example, an e-money service, or the like is registered in a predetermined area of the memory area. The service information management server 102 connected to the mobile terminal device 100 through the network 101 stores service information of a service registered in the IC chip 151 and a service using an application without using the memory area of the IC chip 151, and the mobile terminal device 100 executes a service catalog display process of FIG. 8 to be described later by acquiring the service information stored in the service information management server 102.

An application market server 103 is connected to the mobile terminal device 100 through the network 101, and provides a variety of applications to the mobile terminal device 100.

A service issuing server 104 is connected to the mobile terminal device 100 through the network 101, and issues services to the mobile terminal device 100 by securing the memory area of the IC chip 151. In addition, a reader-and-writer 105 and an information processing device 106 are installed in shops, or the like, and connected to each other. By performing non-contact near field communication between the mobile terminal device 100 and the reader-and-writer 105, a service such as an e-money service, or the like is provided to a user of the mobile terminal device 100.

3. Hardware Configuration of Mobile Terminal Device

Next, a configuration example of hardware of the mobile terminal device 100 will be described with reference to FIG. 4.

Figure 4:
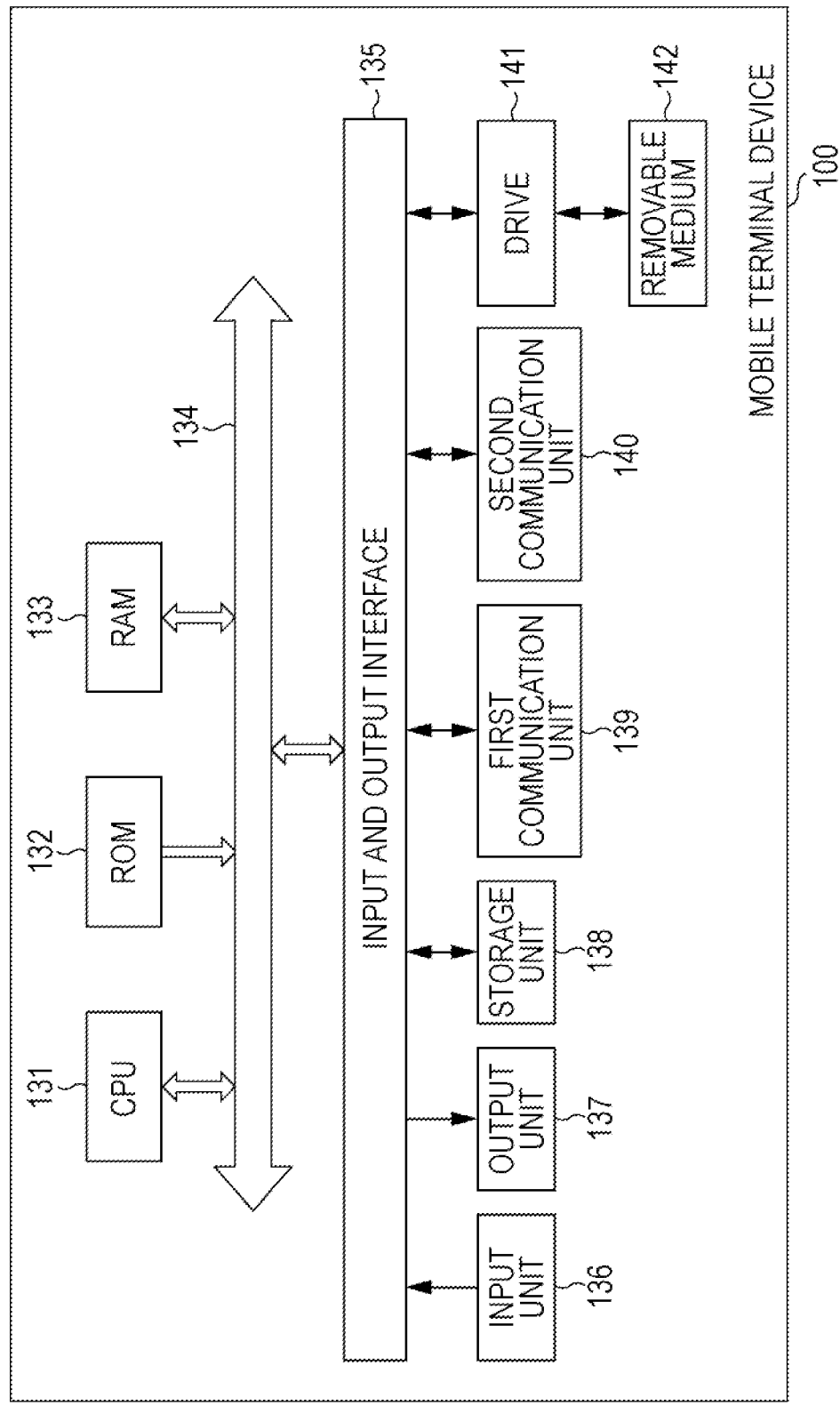
FIG. 4 is a block diagram showing a configuration example of hardware of the mobile terminal device as an information processing device to which the present technology is applied.

In FIG. 4, a CPU (Central Processor Unit) 131 executes various processes according to a program stored in a ROM (Read Only Memory) 132 or a program loaded on a RAM (Random Access Memory) 133. In addition, the RAM 133 appropriately stores data, and the like necessary for executing various processes by the CPU 31.

The CPU 131, the ROM 132, and the RAM 133 are connected to one another via a bus 134. In addition, the bus 134 is connected to an input and output interface 135.

The input and output interface 135 is connected to an input unit 136 including keys, buttons, a touch panel, a microphone, and the like, an output unit 137 including a display such as an LCD (Liquid Crystal Display), an organic EL (Electro-Luminescence), and the like, a speaker, and the like, a storage unit 138 including a hard disk, and the like, a first communication unit 139 including an antenna for performing wireless communication, and the like, and a second communication unit 140 including an antenna for performing non-contact near field communication, and the like.

The storage unit 138 stores unique information of the mobile terminal device 100 for authenticating the mobile terminal device 100.

The first communication unit 139 performs a wireless communication process with a base station not shown in the drawing, and the second communication unit 140 performs non-contact near field communication process with the reader-and-writer 105.

In addition, the input and output interface 135 is connected to a drive 141 as needed, a removable medium 142 including a semiconductor memory, or the like is appropriately mounted thereon, and a computer program read therefrom is installed in the storage unit 138 as needed.

4. Functional Configuration Example of Mobile Terminal Device

Next, a functional configuration example of the mobile terminal device 100 will be described with reference to FIG. 5.

Figure 5:
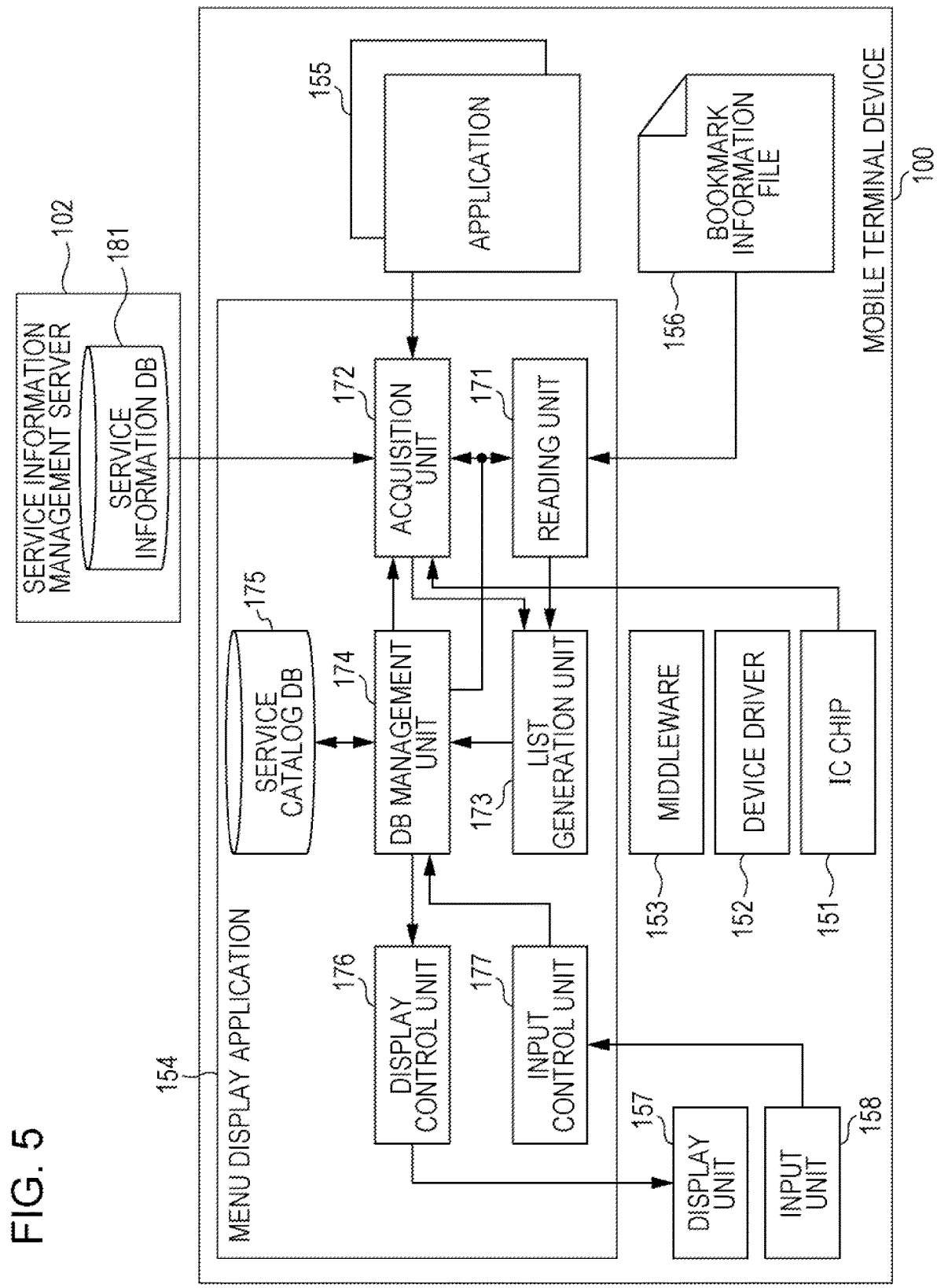
FIG. 5 is a block diagram showing a functional configuration example of the mobile terminal device as an information processing device to which the present technology is applied.

The mobile terminal device 100 of FIG. 5 includes an IC chip 151, a device driver 152, middleware 153, a menu display application 154, an application 155, a bookmark information file 156, a display unit 157, and an input unit 158.

The IC chip 151 includes a memory area, and a part of the memory area is registered with services. The device driver 152 controls each device in the mobile terminal device 100. The middleware 153 includes an API, and provides a predetermined function to the application 155.

The menu display application 154 causes the display unit 157 to display a service catalog based on service information that is information on a service registered in the IC chip 151 and a service using an application not using the memory area of the IC chip 151 and bookmark information that is information on a bookmark for registering a service.

The application 155 is a plurality of applications provided by a service provider, and a part of the application has an area to be used in the memory are of the IC chip 151.

The bookmark information file 156 saves bookmark information that is information on a bookmark for registering at least any service between the service registered in the memory area of the IC chip 151 and a service used in an installed application. The bookmark information file 156 is stored in an unerased system area in the mobile terminal device 100 in advance, or the like.

The display unit 157 is configured to be a display including an LCD, an organic EL, and the like, displays a service catalog of which display is instructed by the menu display application 154, and performs screen display of other applications, screen display of a web browser, or the like.

The input unit 158 is configured to be a button provided in the housing of the mobile terminal device 100, a touch panel provided in the display unit 157 in a superimposing manner, and the like, receives operation inputs of a user, and provides operation signals corresponding to the operation inputs to the menu display application 154.

Herein, a configuration of the menu display application 154 will be described.

The menu display application 154 includes a reading unit 171, an acquisition unit 172, a list generation unit 173, a DB management unit 174, a service catalog DB 175, a display control unit 176 and an input control unit 177.

The reading unit 171 reads the bookmark information file 156, acquires saved bookmark information, and supplies the bookmark information to the list generation unit 173.

The acquisition unit 172 acquires IC chip information that is information on the memory area of the IC chip 151 from the IC chip 151, and acquires application information that is information on the application 155 from the application 155. In addition, the acquisition unit 172 acquires service information of a service specified by each of the IC chip information and the application information from the service information DB 181 of the service information management server 102 based on the acquired IC chip information and application information. The acquisition unit 172 supplies the acquired service information to the list generation unit 173.

The list generation unit 173 generates a list of information (information list) displayed as a service catalog based on the bookmark information from the reading unit 171 and the service information from the acquisition unit 172 and supplies the list to the DB management unit 174.

The DB management unit 174 performs generating, referring to, updating, and the like of the service catalog DB 175 for display the service catalog based on the information list from the list generation unit 173.

The input control unit 175 causes the DB management unit 174 to perform referring to and updating of the service catalog DB 175 based on an operation signal from the input unit 158.

The display control unit 176 acquires the information list for causing the display unit 157 to display the service catalog from the DB management unit 174 by causing the DB management unit 174 to perform referring to the service catalog DB 175, and causes the display unit 157 to display the service catalog based on the information list.

Structure of Service Information

Herein, the structure of the service information acquired from the service information DB 181 of the service information management server 102 will be described with reference to FIG. 6.

As shown in FIG. 6, the service information includes a service ID, a service name, an icon, a service provider name, a URL (Uniform Resource Locator), area information, and application information.

The service ID is information for specifying the service, and the service name is information indicating the name of the service. The icon is image data indicating the service, and service provider name is information indicating the name of the service provider providing the service.

A linked channel is information indicating a software program executed when the service is provided, and is given as an "application" or a "browser" in the example of FIG. 6. When the linked channel is "application", an application unique for the service is activated when the service is provided, and when the linked channel is "browser", the web browser is activated when the service is provided.

The URL is given only when the linked channel is "browser", and is the URL of a web site which the device accesses so that the service uses the memory area of the IC chip 151. In other words, when the service is provided, the web browser is activated to the given URL.

The area information is information on the memory for a service registered in the IC chip 151. The area information includes a system code indicating the entire memory area and an area code indicating a predetermined area formed in the system code. When certain information is present in the area information, the service is assumed to be a service using the memory area of the IC chip 151 without using an application. In other words, services registered in the memory area of the IC chip 151 include those using applications and those not using applications.

The application information is information on an application used by a service which uses an application. The application information includes a package name, a signee certificate hash, an acquisition channel, and an acquisition URL. When any information is present in the package name and the signee certificate hash, the service is assumed to be a service using an application. In addition, the acquisition channel indicates an application (software program) activating when there is no application in the mobile terminal device 100, and the acquisition URL indicates the URL of an acquiring place of an application to be used for a service, which the device accesses by activating the application shown in the acquisition channel. In other words, when an application to be used for a service is not present in the mobile terminal device 100, the application shown in the acquisition channel is activated, and an application to be used for a service is downloaded from the site indicated by the acquisition URL.

Configuration of Bookmark Information

Next, the configuration of the bookmark information saved in the bookmark information file 156 will be described with reference to FIG. 7.

As shown in FIG. 7, the bookmark information includes a service ID, a service name, an icon, a service provider name, a URL, and application information.

Furthermore, since the configuration of the bookmark information of FIG. 7 is configured not to include the area information, and the package name and the signee certificate hash of application information, different from the service information of FIG. 6, and other configuration thereof is the same as that of the service information of FIG. 6, detailed description thereof will be omitted.

In the bookmark information, the same service ID as the corresponding service is given as a service ID. In addition, it is explicitly shown that each of the service name, the icon, and the linked channel of the bookmark information is the service name, the icon, and the linked channel of the bookmark information.

Based on the system code and the area code of the area information, and the package name and the signee certificate hash of the application information out of the service information shown in FIG. 6, the mobile terminal device 100 displays the services on a service catalog as services registered in the IC chip 151 (including services using an application and services not using applications), and services using applications without using the memory area of the IC chip 151. In addition, based on bookmark information of which the same service ID is not present in the service information out of the bookmark information shown in FIG. 7, the mobile terminal device 100 displays the service on a service catalog as a bookmark of a service not registered in the IC chip 151. Hereinafter, the bookmark of a service which is not registered in the IC chip 151 but displayed on the service catalog is referred to as a service bookmark.

5. Service Catalog Display Process

Next, a service catalog display process of the mobile terminal device 100 will be described with reference to the flowchart of FIG. 8. The service catalog display process of FIG. 8 starts when display of the service catalog is instructed by an operation of a user and the menu display application 154 is activated.

In Step S11, the DB management unit 174 determines whether or not the service catalog DB 175 exists.

It is determined that the service catalog DB 175 does not exist in Step S11 in either case where the menu display application 154 is activated for the first time, or where the menu display application 154 is activated after resetting, and the process advances to Step S12.

In Step S12, the reading unit 171 reads the bookmark information file 156 to acquire the saved bookmark information, and supplies the information to the list generation unit 173. If the bookmark information is supplied from the reading unit 171 once, the list generation unit 173 generates a bookmark information list obtained by making the bookmark information into a list, causes the DB management unit 174 to generate the service catalog DB 175, and causes the service catalog DB 175 to retain the bookmark information list until, for example, the menu display application 154 is reset, or the like.

On the other hand, when it is determined that the service catalog DB 175 exists in Step S11, in other words, when the menu display application 154 is activated for the second time or thereafter, the bookmark information (bookmark information list) has already been retained in the service catalog DB 175, and thus, Step S12 is skipped.

In Step S13, the acquisition unit 172 acquires application information that is information on the application 155 from the application 155.

In Step S14, the acquisition unit 172 acquires IC chip information that is information on the memory area of the IC chip 151 from the IC chip 151.

In Step S15, the acquisition unit 172 acquires service information of a service specified by each of the IC chip information and the application information based on the acquired IC chip information and application information from the service information DB 181 of the service information management server 102, and supplies the information to the list generation unit 173.

In Step S16, the list generation unit 173 generates an intra-terminal service information list that is an information list on service registered in the IC chip 151 and services using applications without using the memory area of the IC chip 151 based on the service information from the acquisition unit 172.

In Step S17, the list generation unit 173 makes the bookmark information from the reading unit 171 into a list, and deletes the bookmark information present in the intra-terminal service information list from the bookmark information list of the service catalog DB 175.

Figure 9:
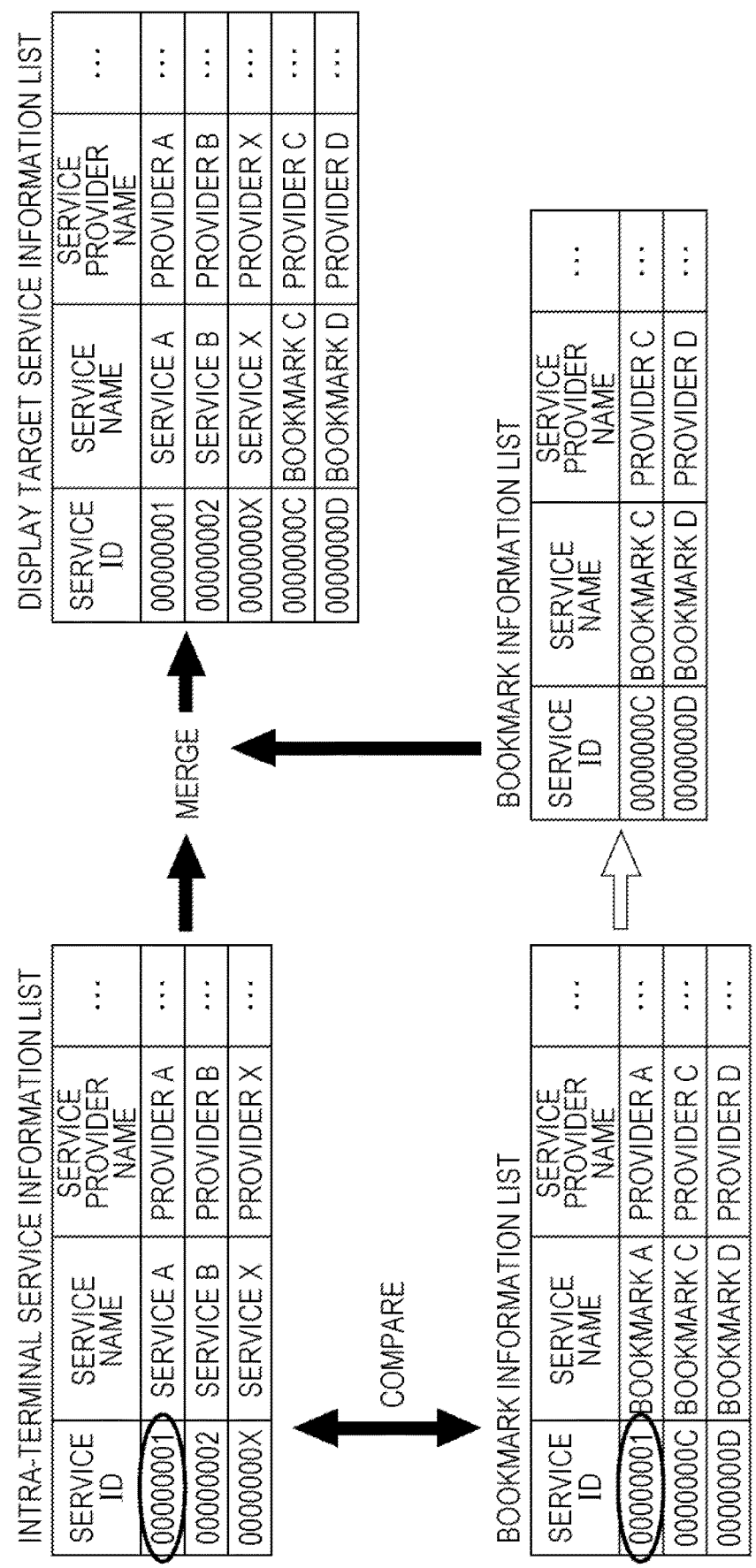
FIG. 9 is a diagram illustrating a flow of information in the service catalog display process.

Specifically, first, the list generation unit 173 compares an intra-terminal service information list including service information of which the service IDs are indicated by "00000001", "00000002", and "0000000X", and a bookmark information list including the bookmark information of which the service IDs are indicated by "00000001", "0000000C", and "0000000D" shown in FIG. 9. Next, the list generation unit 173 deletes bookmark information of which the service IDs match the service IDs of the service information on the intra-terminal service information list in the bookmark information on the bookmark information list. Accordingly, a bookmark information list is obtained, which includes the bookmark information of which the service IDs are indicated by "0000000C" and "0000000D" which are not present in the service information on the intra-terminal service information list.

In Step S18, the list generation unit 173 generates a display target service information list based on the intra-terminal service information list and the bookmark information list, and supplies the list to the DB management unit 174.

In other words, as shown in FIG. 9, the list generation unit 173 merges the intra-terminal service information list including the service information of which the service IDs are indicated by "00000001", "00000002", and "0000000X", and the bookmark information list including the bookmark information of which the service IDs are indicated by "0000000C" and "0000000D", and generates the display target service information list including the service information of which the service IDs are indicated by "00000001", "00000002", and "0000000X", and the bookmark information of which the service IDs are indicated by "0000000C" and "0000000D".

In Step S19, the DB management unit 174 retains the display target service information list from the list generation unit 173 in the service catalog DB 175.

In Step S20, the display control unit 176 acquires the display target service information list from the DB management unit 174 by causing the DB management unit 174 to refer to the service catalog DB 175, and causes the display unit 157 to display the service catalog based on the display target service information list.

According to the above-described process, the service catalog is displayed based on the service information of the services registered in the IC chip 151 and the services using the application, and bookmark information used for registering services not registered among the bookmark information. In other words, also in an IC chip-mounted information processing device on which an open platform is installed, bookmarks of registered services and unregistered services (service bookmark) are displayed on the service catalog. Therefore, even when a desired service is not registered in the information processing device, a user can simply register the desired service based on the service bookmark on the service catalog without the necessity of accessing a web site or an application market for searching the service.

6. Screen Changeover from Service Catalog

Herein, a screen changeover from the service catalog displayed on the display unit 157 in the above-described service catalog display process will be described.

First, with reference to FIGS. 10 and 11, a screen changeover when services displayed on the service catalog are all registered in the mobile terminal device 100 will be described.

Figure 10:
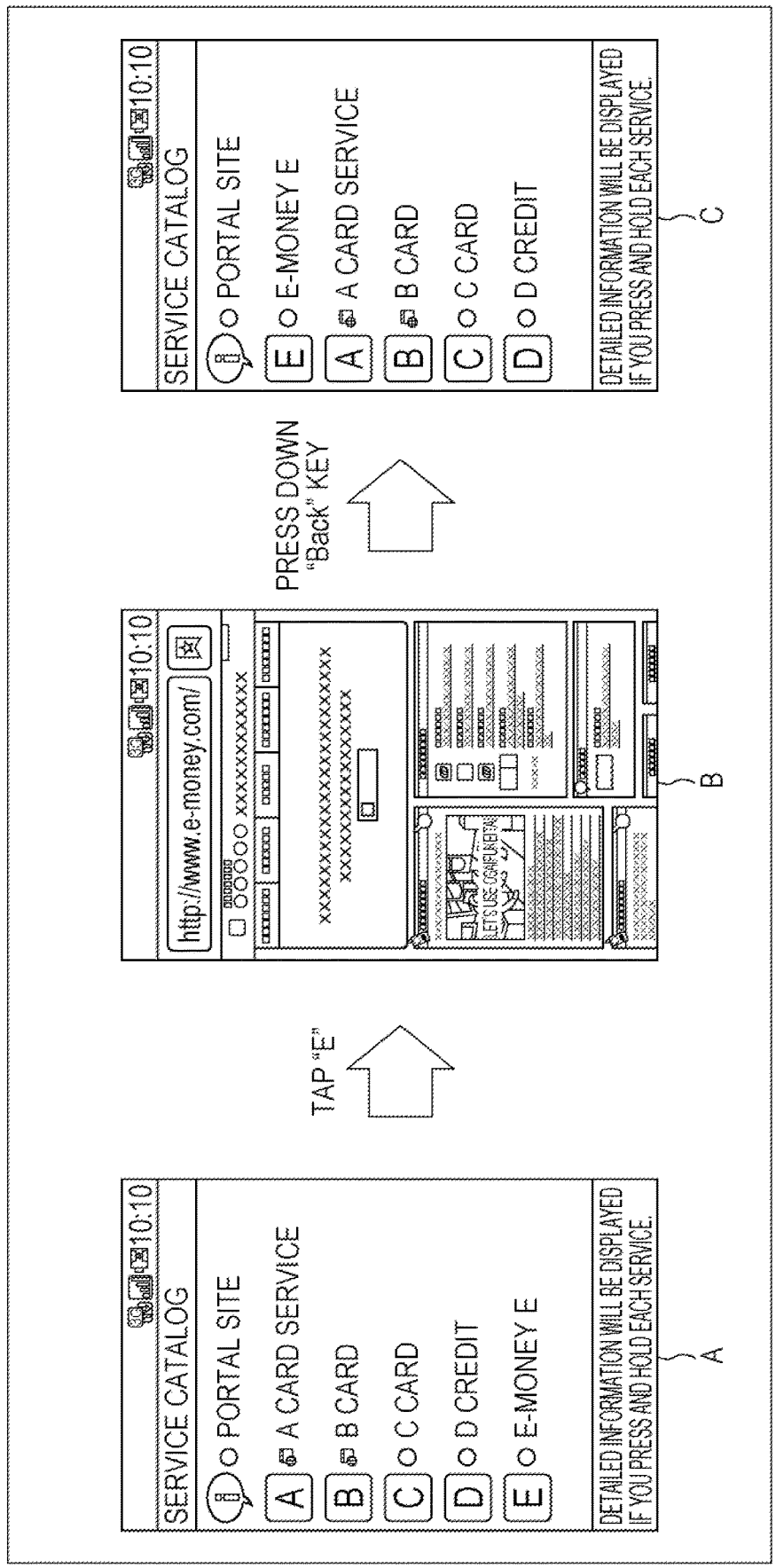
FIG. 10 is a diagram illustrating screen changeovers from a service catalog.

An Example of a Screen Changeover when the Services Displayed on the Service Catalog are Registered First, on the service catalog shown on the display screen of a display state A in FIG. 10, service names and icons of "portal site", "A card service", "B card", "C card", "D credit", and "e-money E" are displayed. The "portal site" is a menu selected by a user when the user accesses the portal site, different from services provided by "A card service", "B card", "C card", "D credit", and "e-money E". Furthermore, the portal site mentioned here refers to a site that serves as a starting point of adopting services by the user, such as introduction of services, or the like.

In the display state A, when an icon "E" (or a service name) on the service catalog is tapped by the user, in other words, a finger of the user presses the icon "E" and is immediately separated therefrom, a browser is displayed on the display screen as shown in a display state B. In the example of FIG. 10, with the browser, the screen of a site which the user accesses with a URL given with the "URL" of the service information of the "e-money E" is displayed. Herein, the "e-money E" is assumed to be a service using the memory area of the IC chip 151.

Following an operation of the user for the browser in the display state B, a predetermined area in the memory area of the IC chip 151 is used for the "e-money E", the operation for the browser is stopped or completed after an e-money service is provided, or the like, and if the user again presses a "Back" key that is one of buttons provided in the housing of the mobile terminal device 100, or the like, as an operation for displaying the service catalog on the first page of the display screen, the service catalog is displayed on the display screen as shown in a display state C. In the service catalog of the display state C, the "e-money E" used by the user is displayed on the further upper stage than other services.

Figure 11:
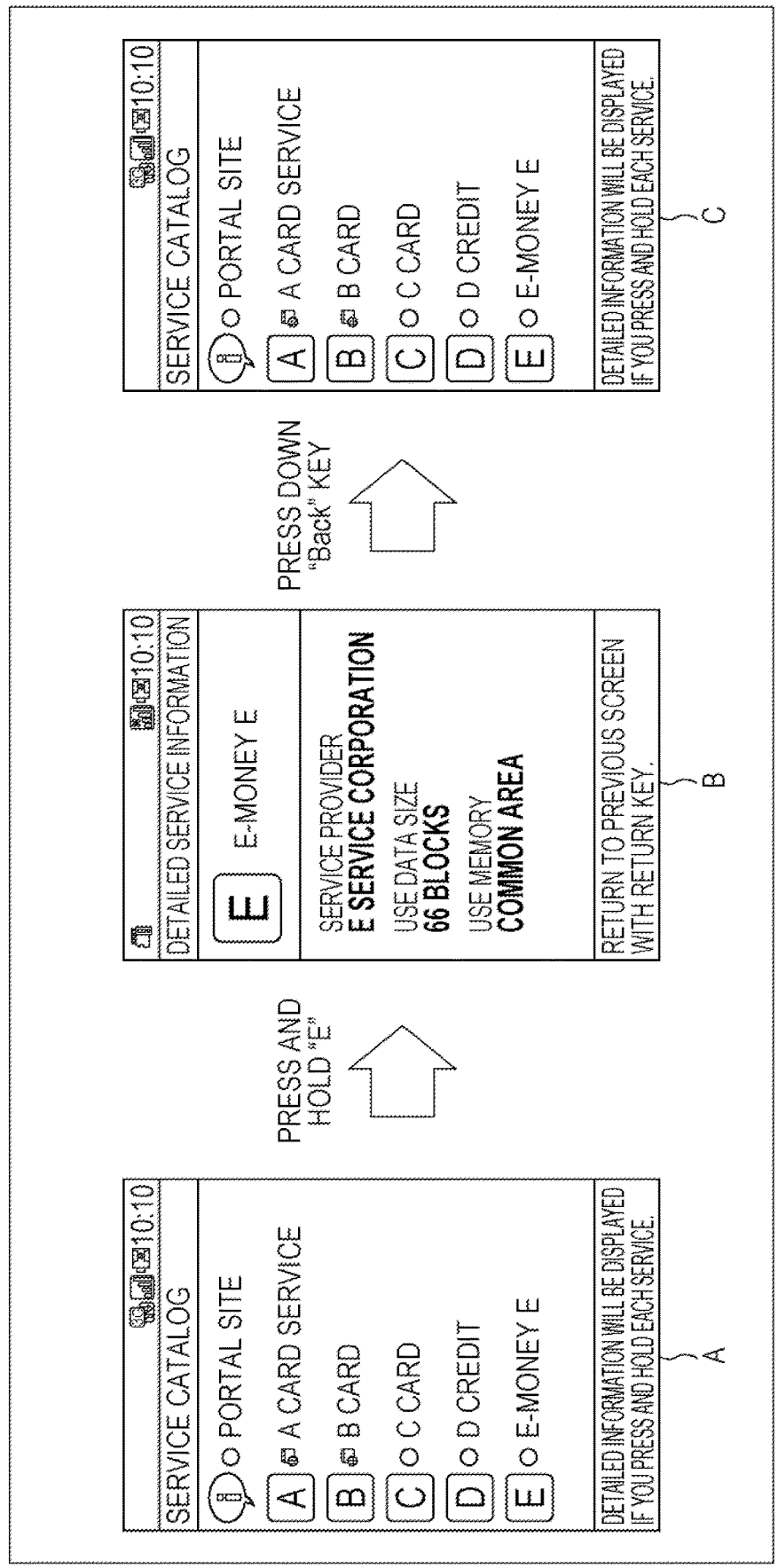
FIG. 11 is a diagram illustrating screen changeovers from the service catalog.

A display state A of FIG. 11 is the same as the display state A of FIG. 10, but if an icon "E" (or the service name) on the service catalog is pressed and held by the user in the display state A, in other words, the finger of the user continues to press the icon "E" for a certain period of time and is separated, detailed service information that is detailed information of the "e-money E" is displayed on the display screen as shown in the display screen B. In the example of FIG. 11, a service provider, a use data size, and a use memory are displayed as the detailed service information. The service provider is displayed based on a "service provider name" of the service information of the "e-money E", and the use data size and the use memory are displayed based on the IC chip information of the IC chip 151.

In the display state B, if the user presses and holds the "Back" key of the mobile terminal device 100 again, or the like, as an operation for displaying the service catalog on the first page of the display screen, the service catalog in the same state of the display state A is displayed on the display screen as shown in the display state C.

As such, when the user taps a registered service on the service catalog, the service is set to be used by the user, and when the user presses and holds the registered service, detailed service information of the service is displayed.

Next, a screen changeover when all services displayed on the service catalog are not registered in the mobile terminal device 100 will be described with reference to FIGS. 12 and 13.

Figure 12:
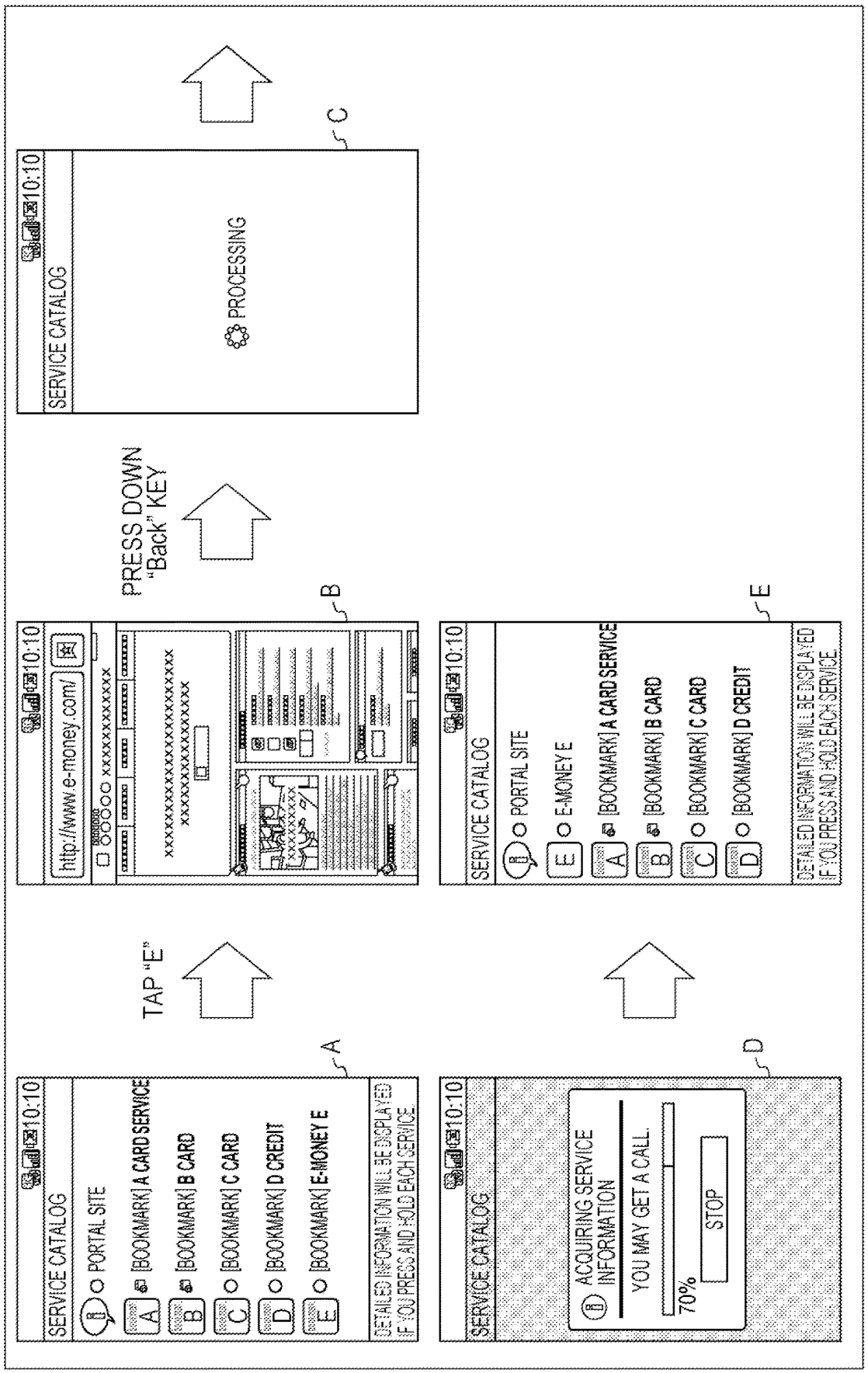
FIG. 12 is a diagram illustrating screen changeovers from the service catalog.

An Example of a Screen Changeover when a Service Displayed on the Service Catalog is not Registered First, in FIG. 12, on the service catalog on the display screen in the display state A, service names and icons of "portal site", "[bookmark] A card service", "[bookmark] B card", "[bookmark] C card", "[bookmark] D credit", and "[bookmark] e-money E" are displayed. Each of the "[bookmark] A card service", "[bookmark] B card", "[bookmark] C card", "[bookmark] D credit", and "[bookmark] e-money E" indicates a service bookmark corresponding to the service provided in the "A card service", "B card", "C card", "D credit", and "e-money E" shown in FIGS. 10 and 11. In addition, each of the icons is attached with the word "bookmark".

In the display state A, if the user taps the icon "E"(or the service name) attached with the word "bookmark" on the service catalog, a browser is displayed on the display screen as shown in the display state B. In the example of FIG. 12, the browser displays the screen of a site which is accessed by a URL which is given with a "URL" of the bookmark information of the "e-money E".

If the memory area of the IC chip 151 to be used by the "e-money E" is secured (issuance of service) according to an operation of the user for the browser in the display state B, and then, the user presses down the "Back" key of the mobile terminal device 100, or the like, as an operation for displaying the service catalog on the first page of the display screen again by stopping or completing the operation for the browser, the display screen displays the word "processing" as shown in the display state C. In addition, after the display state C, a mini screen is displayed which indicates that the menu display application 154 is acquiring information regarding the service catalog, as shown in the display state D.

If acquisition of the information regarding the "e-money E" is completed, the display screen displays the service catalog as shown in the display state E. On the service catalog in the display state E, the service bookmark of the "e-money E" is deleted, and an "e-money E" of which the service is issued is displayed on a higher stage than other service bookmarks is.

Figure 13:
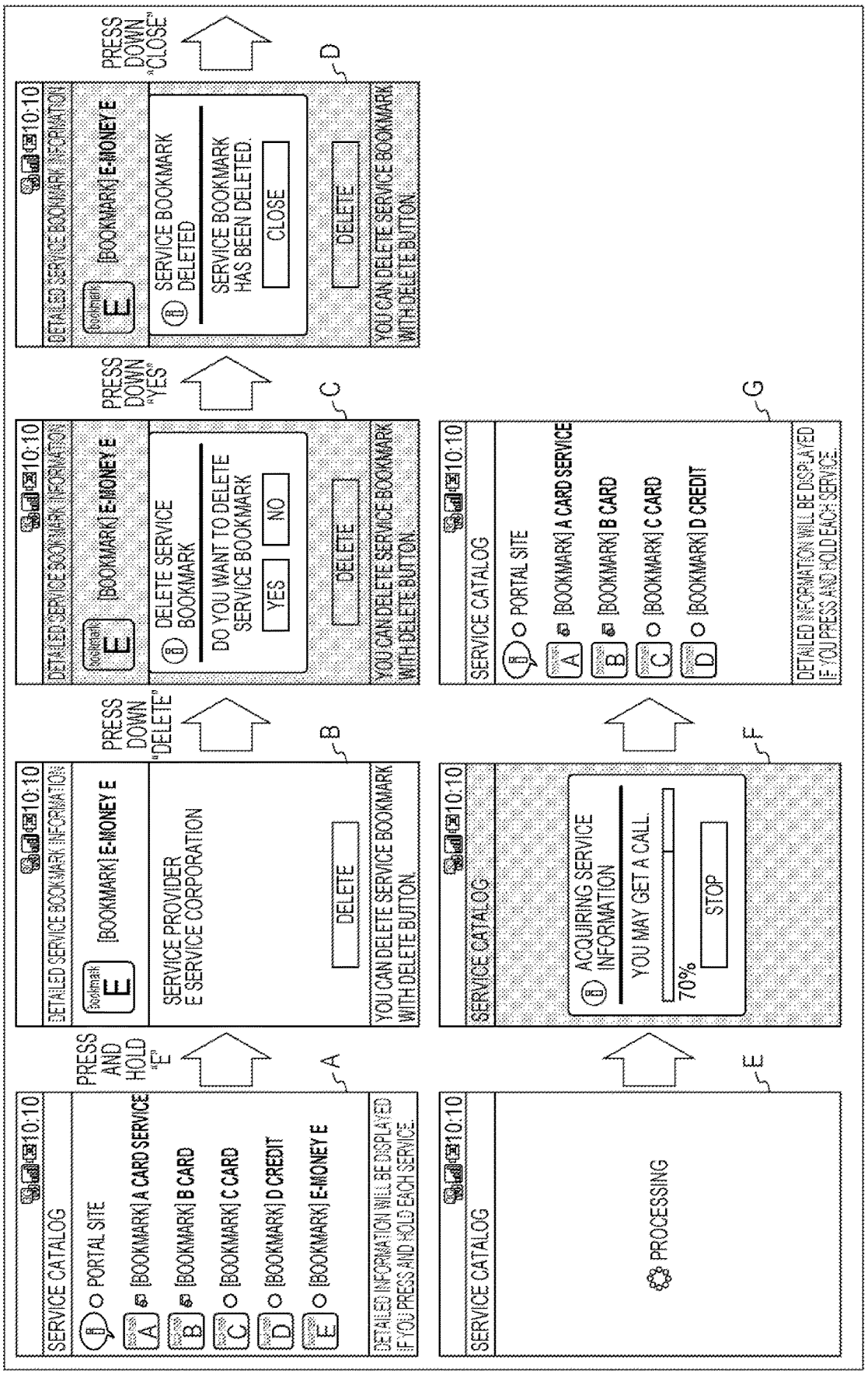
FIG. 13 is a diagram illustrating screen changeovers from the service catalog.

The display state A of FIG. 13 is the same as the display state A of FIG. 12, but in the display state A, if the user presses and holds the icon "E" (or the service name) attached with the "bookmark" on the service catalog, the display screen displays detailed service bookmark information that is detailed information of the service bookmark of the "e-money E", as shown in the display state B. In the example of FIG. 13, a service provider is displayed as the detailed service bookmark information. The service provider is displayed based on a "service provider name" of the bookmark information of the "e-money E". In addition, as shown in the display state B, a "delete" button for deleting the service bookmark from the service catalog is also displayed together with the detailed service bookmark information.

In the display state B, if the user presses down (selects) the "delete" button, the display screen displays a mini screen for causing the user to select whether or not the service bookmark is to be deleted from the service catalog, as shown in the display state C. The mini screen displays a "Yes" button with which the user selects deleting the service bookmark and a "No" button with which the user select not deleting the service bookmark.

In the display state C, if the user presses down (selects) the "Yes" button, the display screen displays a mini screen indicating that the service bookmark has been deleted from the service catalog, as shown in the display screen D. The mini screen displays a "Close" button for closing the mini screen itself.

In the display state D, if the user presses down (selects) the "Close" button, the display screen displays the word "processing", as shown in the display state E. Then, after the display state E, a mini screen is displayed which indicates that the menu display application 154 is acquiring information regarding the service catalog, as shown in the display state F.

If the acquisition of the information regarding the service catalog is completed, the display screen displays the service catalog as shown in the display state G. On the service catalog in the display state G, the service bookmark of the "e-money E" is deleted.

As such, when the user taps a service bookmark on the service catalog, the service is registered, and when the user presses and holds a service bookmark, detailed service bookmark information of the service bookmark is displayed, and the bookmark is deleted.

Next, a process for realizing a screen changeover from the service catalog which has been described in reference to FIGS. 10 to 13 will be described.

7. Service Catalog Screen Changeover Process

Figure 14:
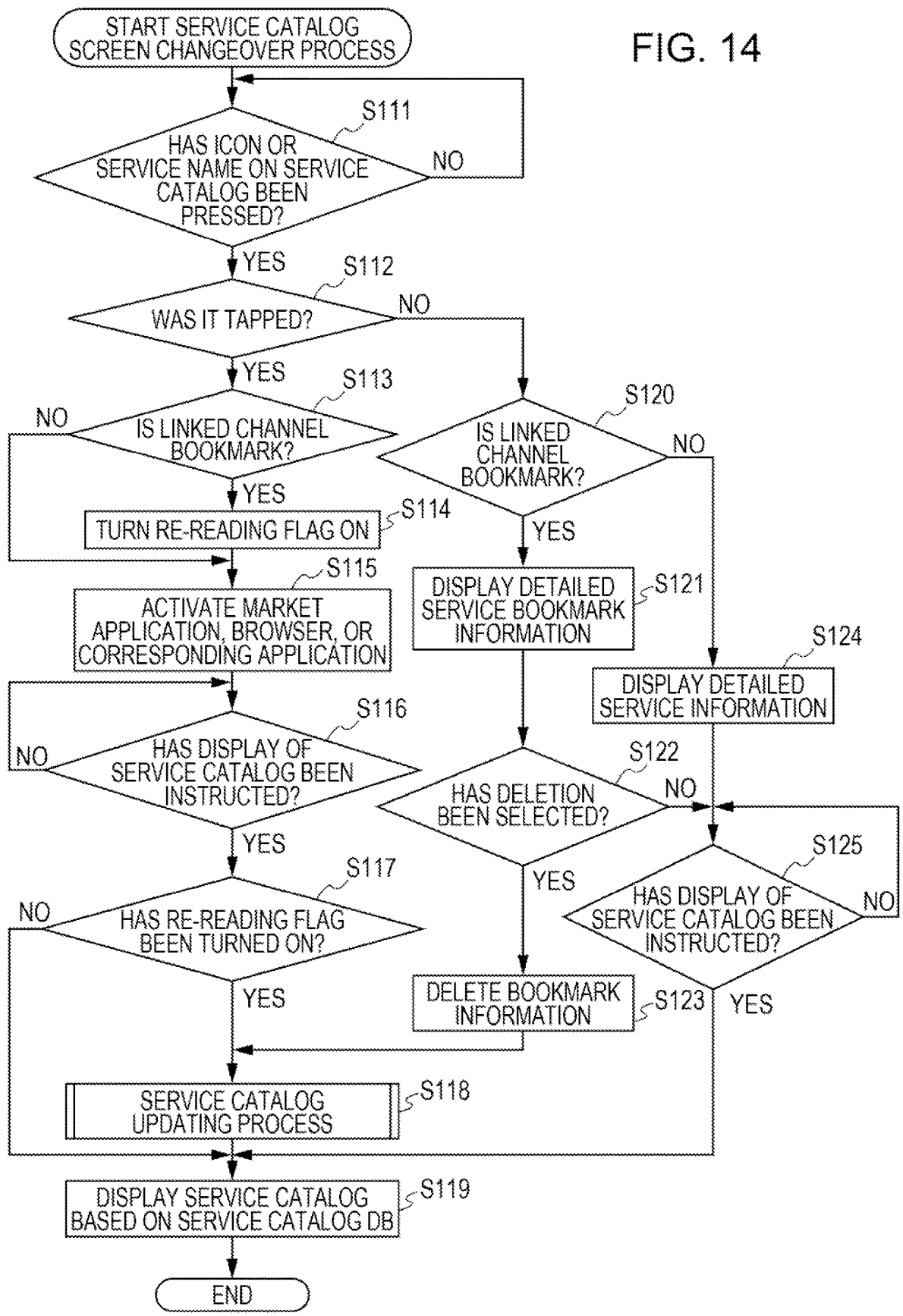
FIG. 14 is a flowchart explaining a service catalog screen changeover process.

FIG. 14 is a flowchart explaining a service catalog screen changeover process in which a screen changeover from the service catalog is realized.

In the state where the service catalog is displayed on the display unit 157 of the mobile terminal device 100, the input control unit 177 determines whether or not an icon or a service name of a service or a bookmark displayed on the service catalog has been pressed down (selected) in Step S111.

The process of Step S111 is repeated until the service, the icon of the service bookmark, or the service name is pressed down. Then, it is determined that the service, the icon of the service bookmark, or the service name is pressed down in Step S111, the input control unit 177 determines whether or not the service, the icon of the service bookmark, or the service name has been tapped in Step S112. If it is determined to be tapped in Step S112, the process advances to Step S113.

In Step S113, the DB management unit 174 refers to the service catalog DB 175, and determines whether or not the linked channel of service information of the service or bookmark information of the service bookmark tapped is a bookmark on the display target service information list.

In Step S113, when the linked channel of the service information or the bookmark information is determined to be a bookmark, the process advances to Step S114, and the DB management unit 174 sets a re-read flag temporarily retained in the menu display application 154 to on.

On the other hand, in Step S113, when the linked channel of the service information or the bookmark information is not determined to be a bookmark, Step S114 is skipped.

Then, in Step S115, a market application, a browser, or a corresponding service application is activated. Herein, when the re-read flag is on, what is pressed down (selected) on the service catalog is the service bookmark, and therefore, a market application, or a browser for acquiring (registering) the corresponding service is activated (display state B of FIG. 12). In addition, when the re-read flag is not on, what is pressed down (selected) on the service catalog is a registered service, and therefore, a browser or a corresponding service application for causing the user to use the service (display state B of FIG. 10).

After Step S115, the screen is changed over as described in FIG. 10 or 12, and in Step S116, the input control unit 177 determines whether or not display of the service catalog on the first page of the display screen has been instructed, specifically, for example, the Back key has been pressed down.

The process of Step S116 is repeated until display of the service catalog is instructed. Then, in Step S116, if display of the service catalog is instructed, the menu display application 154 determines whether or not the re-read flag is on in Step S117.

In Step S117, when the re-read flag is determined to be on, in other words, as described in the example of FIG. 12, when the service bookmark is selected on the service catalog and a corresponding service is registered, the process advances to Step S118, and the menu display application 154 executes a service catalog updating process in which the display of the service catalog is updated from the display state A to the display state E of FIG. 12.

Figure 8:
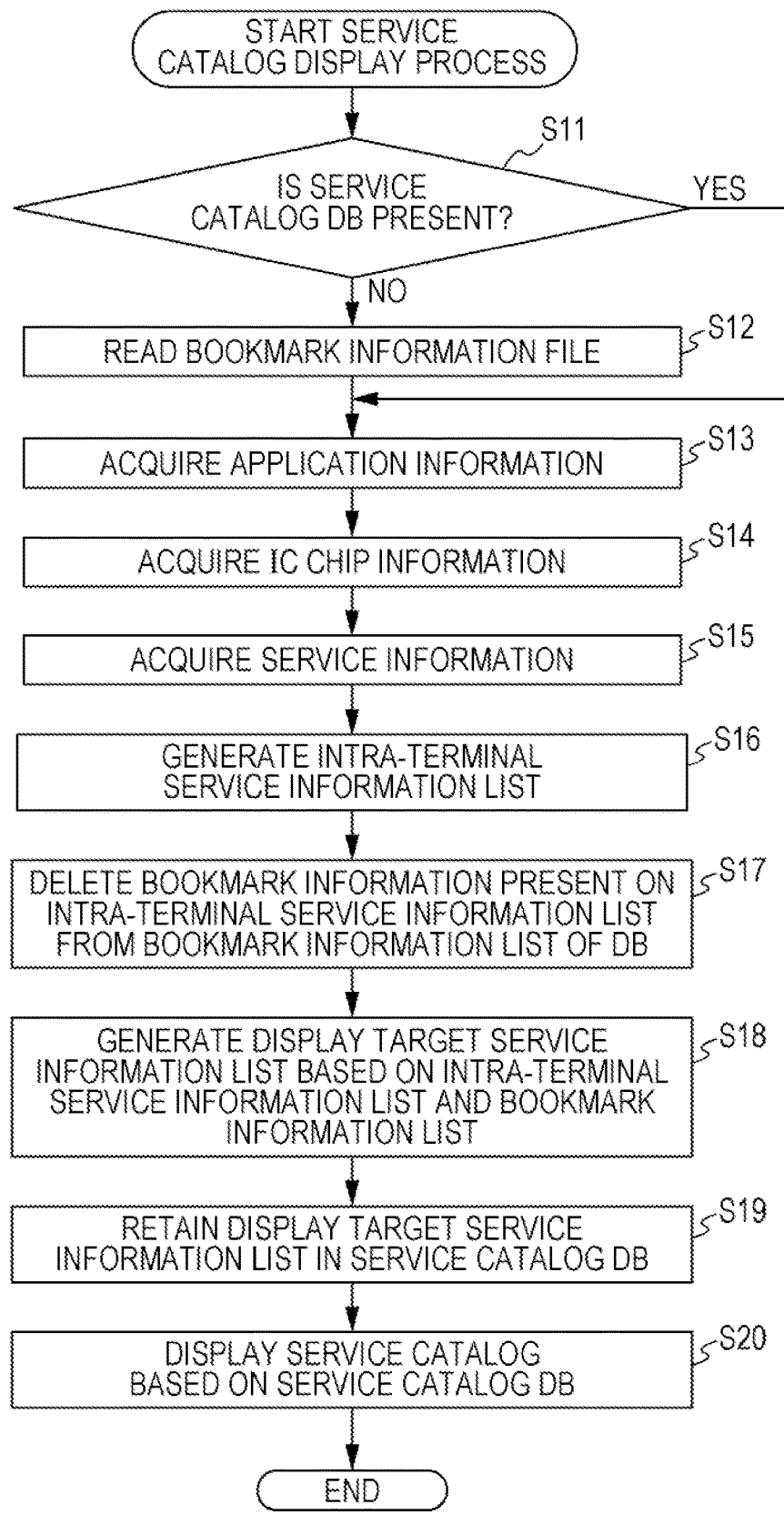
FIG. 8 is a flowchart explaining a service catalog display process.

Herein, in the service catalog updating process, since the same process as that of Steps S11 to S19 of the flowchart explaining the service catalog display process of FIG. 8 is executed, detailed description thereof will be omitted.

In other words, in the case of the example of FIG. 12, service information of "e-money E" newly registered is acquired, and the service ID of the "e-money E" is present in both the intra-terminal service information list and the bookmark information list in the service catalog updating process. Thus, the bookmark information of the "e-money E" is deleted from the bookmark information list, and finally, the service catalog DB 175 is updated by generating a display target service information list including the service information of the "e-money E" and not including the bookmark information of the "e-money E".

On the other hand, in Step S117, when the re-read flag is determined to not be on, in other words, when a service is selected on the service catalog and a corresponding service is used as described in the example of FIG. 10, Step S118 is skipped. In other words, in the case of the example of FIG. 10, the service catalog DB 175 is not updated.

In Step S119, the display control unit 176 acquires the display target service information list from the DB management unit 174 by causing the DB management unit 174 to refer to the service catalog DB 175, and causes the display unit 157 to display the service catalog based on the display target service information list.

Incidentally, in Step S112, when it is determined that tapping is not performed, in other words, when it is determined that pressing and holding is performed, the process advances to Step S120.

In Step S120, the DB management unit 174 refers to the service catalog DB 175, and determined whether or not the linked channel of the service information of the service or the bookmark information of the service bookmark tapped on the display target service information list is a bookmark.

In Step S120, when the linked channel of the service information or the bookmark information is a bookmark, the process advances to Step S121, and the display control unit 176 acquires the display target service information list from the DB management unit 174 by causing the DB management unit 174 to refer to the service catalog DB 175. Then, the display control unit 176 causes the display unit 157 to display detailed service bookmark information based on the service provider name of the bookmark information of the service bookmark pressed and held on the display target service information list (display state B of FIG. 13).

In Step S122, the input control unit 177 determines whether or not the "delete" button has been selected, in the display state B of FIG. 13.

In Step S122, when the "delete" button is determined to be selected, the process advances to Step S123, and the DB management unit 174 deletes corresponding bookmark information from the bookmark information list retained in the service catalog DB 175. After that, the process advances to Step S118, and a service catalog updating process is executed, in which display of the service catalog is updated from the display state A to the display state G of FIG. 13.

In other words, in the case of the example of FIG. 13, the bookmark information of the "e-money E" is deleted from the bookmark information list of the service catalog DB 175, and finally, the service catalog DB 175 is updated by generating a display target service information list not including the bookmark information of the "e-money E".

On the other hand, in Step S120, when the linked channel of the service information of the bookmark information is not a bookmark, the process advances to Step S124.

In Step S124, the display control unit 176 acquires the display target service information list from the DB management unit 174 by causing the DB management unit 174 to refer to the service catalog DB 175. In addition, the display control unit 176 acquires IC chip information from the IC chip 151. Then, the display control unit 176 causes the display unit 157 to display detailed service information based on the service provider name of the bookmark information of the service bookmark pressed and held and the use data size and the use memory of the IC chip information on the display target service information list (display state B of FIG. 11).

When the "delete" button is determined to be selected after Step S124 or in Step S122, the input control unit 177 determines whether or not display of the service catalog on the first page of the display screen has been instructed, specifically, for example, the Back key has been pressed down in Step S125.

The process of Step S125 is repeated until display of the service catalog is instructed. Then, in Step S125, if display of the service catalog is determined to be instructed, the process advances to Step S119, and the service catalog is displayed without updating the service catalog DB 175.

According to the above processes, when the user taps the service bookmark on the service catalog, the service can be registered, and when the user presses and holds the service bookmark, detailed service bookmark information of the service bookmark is displayed, and the bookmark can be deleted. Particularly, on the service catalog, when the service bookmark is tapped and the corresponding service is registered, display of the service catalog is updated, and the service bookmark tapped is displayed as a service, and therefore, the user can visually recognize that the registration of the service is normally performed.

Incidentally, in the description above, in the application information of the bookmark information described referring to FIG. 7, the acquisition channel indicates an application activated when an application is not present in the mobile terminal device 100, and the acquisition URL indicates the URL of the acquisition source of an application to be used for a service, which can be accessed by activating the application indicated as the acquisition channel.

However, the application activated based on application information of the bookmark information may be an application other than an application activated for registering services.

8. Example of Application Activated by Bookmark Information

Figure 15:
FIG. 15 is a diagram showing an example of an application activated by bookmark information.

A mail program can be activated as shown in FIG. 15 by, for example, designating an application for writing and generating an e-mail for the acquisition channel and a predetermined mail address (for example, aaa@aa.aa, or the like) for the acquisition URL in the application information of the bookmark information.

Figure 16:
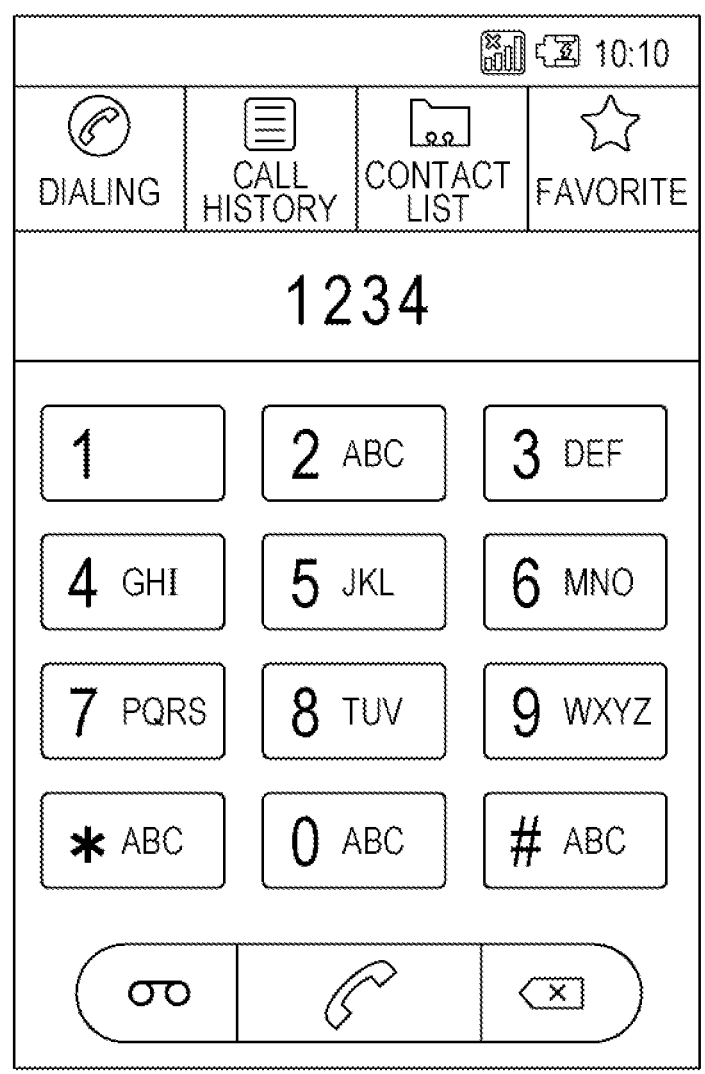
FIG. 16 is a diagram showing an example of an application activated by the bookmark information.

In addition, a telephone application can be activated as shown in FIG. 16, by, for example, designating an application for making a call for the acquisition channel and a predetermined telephone number (for example, 1234, or the like) for the acquisition URL in the application information of the bookmark information.

In addition, for example, by designating the mail address or the telephone number of the customer center, or the like of a service provider as the mail address or the telephone number described above, the user can make simple inquiry or the like without looking up the contact number of the customer center of the service provider, only by selecting the bookmark on the service catalog.

9. Others

In addition, as the bookmark information described with reference to FIG. 7, bookmark information of a relevant service relating to a predetermined service may be set.

Accordingly, when, for example, relevant area information is provided as an item of bookmark information of the relevant service, the service bookmark of the relevant service is selected (tapped) on the service list, and a service is registered in the memory area of the IC chip 151 indicated by the relevant area information, in other words, when service information having area information that coincides with the relevant area information is present on a display target service information list, an application indicated by application information in bookmark information of the relevant service can be activated.

In addition, when, for example, a relevant service ID is provided as an item of the bookmark information of the relevant service, the service bookmark of the relevant service is selected (tapped) on the service catalog, and the service indicated by the relevant service ID is registered, in other words, when service information having a service ID that coincides with the relevant service ID is present on the display target service information list, an application indicated as application information in the bookmark information of the relevant service can be activated.

In addition, in the configuration of FIG. 5, the bookmark information file 156 is assumed to be stored in advance in a system area, or the like not deleted in the mobile terminal device 100, but may be stored on an external server outside the mobile terminal device 100, for example, in the service information management server 102, or the like, and the reading unit 171 may read the bookmark information saved in the bookmark information file 156 of the external server.

Accordingly, since it is possible to add or change the bookmark information saved in the bookmark information file 156 even after the mobile terminal device 100 is shipped as a product, a user can check the service catalog including the latest bookmarks at all time, and furthermore, can use the latest services.

A series of processes described above can be executed by hardware, and can be executed by software. When the series of processes is executed by software, a program constituting the software is installed in, for example, a computer incorporating dedicated hardware, a general-purpose personal computer which can execute various functions by installing various programs, or the like, from a program recording medium.

A program recording medium which is installed in a computer and stores a program that is in computer executable state includes a magnetic disk (including a flexible disk), an optical disc (including a CD-ROM (Compact Disc-Read Only Memory), and a DVD (Digital Versatile Disc)), including an optical-magneto disc), a removable medium 61 that is a package medium including a semiconductor memory, a hard disk including a ROM 132 and a RAM 133 temporarily or permanently storing programs, or the like, as shown in FIG. 4. Storage of programs on a program storing medium is performed using a wired or wireless communication medium such as a network, a Local Area Network, the Internet, or digital satellite broadcasting through a communication unit which is an interface such as a router, a modem, or the like but not shown in the drawing, as needed.

In addition, a program executed by a computer may be a program in which processes are performed in time series according to the order described in the present specification, or may be a program in which processes are performed in parallel or at an essential timing when call-out is performed, or the like.

Furthermore, an embodiment of the present technology is not limited to the above-described embodiment, and can be variously modified within a range not departing from the gist of the technology.

Furthermore, the present technology can have configurations as below.

(1) An information processing device including:
a reading unit which reads bookmark information that is information on a bookmark for registering at least one of a service using a memory area of an IC chip and a service using an application;
an acquisition unit which acquires service information for causing a user to use the service that has already been registered; and
a display control unit which controls display of a catalog of service bookmarks that are the bookmarks of the service that has already been registered and the service that has not been registered based on the service information and the bookmark information.

(2) The information processing device described in (1) further including:

a generation unit which generates an information list including the service information and the bookmark information for registering the service that has not been registered out of the bookmark information, and wherein the display control unit controls display of the catalog based on the information list.

(3) The information processing device described in (2), wherein, when the user selects the service bookmark in the catalog, the acquisition unit acquires the service information for causing the service corresponding to the selected service bookmark to be used, and wherein the generation unit deletes the bookmark information of the service bookmark selected by the user from and adds the service information acquired by the acquisition unit to the information list.

(4) The information processing device described in (3), wherein, when the user taps the service bookmark in the catalog and the corresponding service is registered, the acquisition unit acquires the service information for causing the registered service to be used, wherein the generation unit deletes the bookmark information of the service bookmark tapped by the user from and adds the service information acquired by the acquisition unit to the information list, and wherein the display control unit updates display of the catalog based on the information list.

(5) The information processing device described in (2), wherein, when the user selects the service bookmark in the catalog, the generation unit deletes the bookmark information of the service bookmark selected by the user from the information list.

(6) The information processing device described in (5), wherein, when the user presses and holds the service bookmark in the catalog, the generation unit deletes the bookmark information of the service bookmark pressed and held by the user from the information list, and wherein the display control unit updates display of the catalog based on the information list.

(7) The information processing device described in (1) or (2), wherein, when the user selects the service bookmark in the catalog, an application for writing and transmitting an e-mail is activated.

(8) The information processing device described in (1) or (2), wherein, when the user selects the service bookmark in the catalog, an application for making a call is activated.

(9) The information processing device described in (2), wherein, when the service corresponding to the service bookmark is a relevant service relating to a predetermined service, and the user selects the service bookmark in the catalog, in a case where the service information of the predetermined service is present on the information list, an application for the relevant service is activated.

(10) The information processing device described in any one of (1) to (9), wherein the reading unit reads the bookmark information saved in an internal file.

(11) The information processing device described in any one of (1) to (9), wherein the reading unit reads the bookmark information saved in an external file.

(12) An information processing method including:

a reading step of reading bookmark information that is information on a bookmark for registering at least one of a service using a memory area of an IC chip and a service using an application;

an acquiring step of acquiring service information for causing a user to use the service that has already been registered; and a display control step of controlling display of a catalog of service bookmarks that are the bookmarks of the service that has already been registered and the service that has not been registered based on the service information and the bookmark information.

(13) A program which causes a computer to execute processes including:

a reading step of reading bookmark information that is information on a bookmark for registering at least one of a service using a memory area of an IC chip and a service using an application;

an acquiring step of acquiring service information for causing a user to use the service that has already been registered; and a display control step of controlling display of a catalog of service bookmarks that are the bookmarks of the service that has already been registered and the service that has not been registered based on the service information and the bookmark information.

REFERENCE SIGNS LIST

100 MOBILE TERMINAL DEVICE
151 IC CHIP
154 MENU DISPLAY APPLICATION
155 APPLICATION
156 BOOKMARK INFORMATION FILE
157 DISPLAY UNIT
158 INPUT UNIT
171 READING UNIT
172 ACQUISITION UNIT
173 LIST GENERATION UNIT
174 DB MANAGEMENT UNIT
175 SERVICE CATALOG DB
176 DISPLAY CONTROL UNIT
177 INPUT CONTROL UNIT

The invention claimed is:

1. A device, comprising:

a display screen; and a processor configured to:

acquire first list information that indicates a first service unregistered in an integrated circuit of the device and a second service registered in the integrated circuit of the device, wherein the first list information is acquired from within the device;

acquire second list information that indicates the second service;

compare a first service identification number of the second service included in the acquired first list information with a second service identification number of the second service included in the acquired second list information;

delete an indication of the second service from the first list information based on the first service identification number that matches the second service identification number;

update the first list information based on the deletion of the indication of the second service from the first list information;

wherein the updated first list information is different from the second list information;

combine the updated first list information and the second list information;

generate third list information based on the combination of the updated first list information and the second list information,
    wherein the updated first list information includes first information that corresponds to a Uniform Resource Locator (URL) of a website to register the first service;
control, based on the generated third list information, the display screen to concurrently display the updated first list information indicating the first service unregistered in the integrated circuit of the device and the second list information indicating the second service registered in the integrated circuit of the device;
control the display screen to display a first icon at a first position on the display screen,
    wherein the first icon is associated with the first service unregistered in the integrated circuit of the device;
select the first icon based on a first user input;
register the first service in the integrated circuit of the device based on the selection of the first icon;
acquire first service information based on a second user input;
control, based on the registration of the first service in the integrated circuit of the device and completion of the acquisition of the first service information, the display screen to display a second icon at a second position on the display screen, wherein
    the second icon is associated with the first service registered in the integrated circuit of the device,
    the first position is different from the second position, and
    the first icon is different from the second icon;
control the display screen to display a third icon at a third position on the display screen,
    wherein the third icon corresponds to the second service registered in the integrated circuit of the device; and
initiate display of first detailed service information for the second service based on a selection of the third icon,
    wherein the first detailed service information includes a service provider name of the second service.

2. The device as recited in claim 1, wherein the processor is further configured to acquire the second list information from a server external to the device.

3. The device as recited in claim 1, wherein
the first information corresponds to an area of the display screen, and
the area of the display screen corresponds to the first icon of the first service unregistered in the integrated circuit of the device.

4. The device as recited in claim 1, wherein the processor is further configured to receive each of the first user input and the second user input through a touch panel of the display screen.

5. The device as recited in claim 1, wherein
the processor is further configured to initiate display of second detailed service information for the first service unregistered in the integrated circuit of the device, based on a selection of an area of the display screen, and
the area of the display screen corresponds to the first icon of the first service unregistered in the integrated circuit of the device.

6. The device as recited in claim 5, wherein the processor is further configured to receive each of the first user input and the second user input through a touch panel of the display screen.

7. The device as recited in claim 1, wherein
the processor is further configured to set the second service based on a selection of an area of the display screen, and
the area of the display screen corresponds to the second icon.

8. The device as recited in claim 7, wherein the processor is further configured to receive each of the first user input and the second user input through a touch panel of the display screen.

9. The device as recited in claim 1, wherein the updated first list information further includes information related to a bookmark to register a third service.

10. The device as recited in claim 1, wherein the second list information is information to allow a user to access a registered service.

11. The device as recited in claim 1, wherein the processor is further configured to control, based on second service information in the second list information and the first information, the display screen to display the first list information and the second list information.

12. The device as recited in claim 1, wherein
the first list information further includes second information that corresponds to an activation link, and
the activation link corresponds to a telephone application used to make a call to a specific number.

13. An information processing method, comprising:
acquiring first list information that indicates a first service unregistered in an integrated circuit of a device and a second service registered in the integrated circuit of the device, wherein the first list information is acquired from within the device;
acquiring second list information that indicates the second service;
comparing a first service identification number of the second service included in the acquired first list information with a second service identification number of the second service included in the acquired second list information;
deleting an indication of the second service from the first list information based on the first service identification number that matches the second service identification number;
updating the first list information based on the deletion of the indication of the second service from the first list information;
    wherein the updated first list information is different from the second list information;
combining the updated first list information and the second list information;
generating third list information based on the combination of the updated first list information and the second list information,
    wherein the updated first list information includes first information that corresponds to a Uniform Resource Locator (URL) of a website to register the first service;
controlling, based on the generated third list information, a display screen of the device to concurrently display the updated first list information indicating the first service unregistered in the integrated circuit of the device and the second list information indicating the second service registered in the integrated circuit of the device;

controlling the display screen to display a first icon at a first position on the display screen,
wherein the first icon is associated with the first service unregistered in the integrated circuit of the device;

selecting the first icon based on a first user input;

registering the first service in the integrated circuit of the device based on the selection of the first icon;

acquiring service information based on a second user input;

controlling, based on the registration of the first service in the integrated circuit of the device and completion of the acquisition of the service information, the display screen to display a second icon at a second position on the display screen, wherein
the second icon is associated with the first service registered in the integrated circuit of the device,
the second position is different from the first position, and
the first icon is different from the second icon;

controlling the display screen to display a third icon at a third position on the display screen,
wherein the third icon corresponds to the second service registered in the integrated circuit of the device; and initiating display of detailed service information for the second service based on a selection of the third icon,
wherein the detailed service information includes a service provider name of the second service.

14. The method as recited in claim 13, further comprising acquiring the second list information from a server external to the device.

15. A non-transitory computer-readable medium having stored thereon computer-executable instructions that, when executed by a processor, cause the processor to execute operations, the operations comprising:

acquiring first list information that indicates a first service unregistered in an integrated circuit of a device and a second service registered in the integrated circuit of the device, wherein the first list information is acquired from within the device;

acquiring second list information that indicates the second service;

comparing a first service identification number of the second service included in the acquired first list information with a second service identification number of the second service included in the acquired second list information;

deleting an indication of the second service from the first list information based on the first service identification number that matches the second service identification number;

updating the first list information based on the deletion of the indication of the second service from the first list information;
wherein the updated first list information is different from the second list information;

combining the updated first list information and the second list information;

generating third list information based on the combination of the updated first list information and the second list information,
wherein the updated first list information includes first information that corresponds to a Uniform Resource Locator (URL) of a website to register the first service;

controlling, based on the generated third list information, a display screen of the device to concurrently display the updated first list information indicating the first service unregistered in the integrated circuit of the device and the second list information indicating the second service registered in the integrated circuit of the device;

controlling the display screen to display a first icon at a first position on the display screen,
wherein the first icon is associated with the first service unregistered in the integrated circuit of the device;

selecting the first icon based on a first user input;

registering the first service in the integrated circuit of the device based on the selection of the first icon;

acquiring service information based on a second user input;

controlling, based on the registration of the first service in the integrated circuit of the device and completion of the acquisition of the service information, the display screen to display a second icon at a second position on the display screen, wherein
the second icon is associated with the first service registered in the integrated circuit of the device,
the second position is different from the first position, and
the first icon is different from the second icon;

controlling the display screen to display a third icon at a third position on the display screen, wherein
the third icon corresponds to the second service registered in the integrated circuit of the device; and initiating display of detailed service information for the second service based on a selection of the third icon,
wherein the detailed service information includes a service provider name of the second service.

16. The non-transitory computer-readable medium as recited in claim 15, further comprising acquiring the second list information from a server external to the device.

* * * * *